(12) United States Patent
Larsson et al.

(10) Patent No.: US 12,466,503 B2
(45) Date of Patent: Nov. 11, 2025

(54) VEHICLE AND METHOD FOR CONTROLLING A VEHICLE

(71) Applicant: Volvo Truck Corporation, Gothenburg (SE)

(72) Inventors: Lena Larsson, Västra Frölunda (SE); Håkan Björklund, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 560 days.

(21) Appl. No.: 18/088,883

(22) Filed: Dec. 27, 2022

(65) Prior Publication Data

US 2023/0234656 A1 Jul. 27, 2023

(30) Foreign Application Priority Data

Jan. 25, 2022 (EP) ..................................... 22153217

(51) Int. Cl.
  *B62D 59/04* (2006.01)
  *B60L 15/38* (2006.01)
(52) U.S. Cl.
  CPC .............. *B62D 59/04* (2013.01); *B60L 15/38* (2013.01); *B60L 2200/28* (2013.01)
(58) Field of Classification Search
  CPC ...... B62D 59/04; B62D 61/12; B62D 61/125; B60L 15/38; B60L 2200/28; B60L 2240/60; B60L 2240/62; B60L 2240/622; B60L 15/20; B60K 2001/001
  See application file for complete search history.

(56) References Cited

U.S. PATENT DOCUMENTS

| | | | |
|---|---|---|---|
| 10,596,913 B2* | 3/2020 | Healy | ................. B60L 15/2018 |
| 2019/0291593 A1 | 9/2019 | Healy et al. | |
| 2021/0101477 A1* | 4/2021 | Gaither | ................... F16D 41/00 |
| 2021/0129669 A1 | 5/2021 | Vande Haar | |
| 2021/0252983 A1 | 8/2021 | Nahrwold et al. | |

(Continued)

FOREIGN PATENT DOCUMENTS

FR 2980438 A1 3/2013

OTHER PUBLICATIONS

Extended European Search Report for European Patent Application No. 22153217.9, mailed Jul. 21, 2022, 7 pages.

*Primary Examiner* — Paul N Dickson
*Assistant Examiner* — Matthew D Lee
(74) *Attorney, Agent, or Firm* — Withrow & Terranova, PLLC

(57) ABSTRACT

A vehicle comprising an electrically driven wheel axle having at least two road wheels, an electric machine for providing propulsion power to the wheel axle, and a control unit configured to obtain positional data of the vehicle, the positional data containing information about the geographical location of the vehicle or the location of the vehicle relative to a reference point/area. Upon determination by the control unit that the vehicle's current location is a location where propelling by providing electric propulsion to the wheel axle is not permitted, the control unit is configured to generate an output signal which automatically causes, or which suggests via a user interface notification to cause, a temporary disablement of the wheel axle and the at least two road wheels from providing a contribution to the propulsion power that propels the vehicle. A method of controlling a vehicle is also disclosed.

19 Claims, 5 Drawing Sheets

(56) References Cited

U.S. PATENT DOCUMENTS

| | | | |
|---|---|---|---|
| 2021/0253213 A1* | 8/2021 | Sato | B63H 20/08 |
| 2023/0150481 A1* | 5/2023 | Jones | B60L 50/61 |
| | | | 701/69 |
| 2025/0135959 A1* | 5/2025 | Jones | B60L 3/04 |

* cited by examiner

VEHICLE AND METHOD FOR CONTROLLING A VEHICLE

RELATED APPLICATIONS

The present application claims priority to European Patent Application No. 22153217.9, filed on Jan. 25, 2022, and entitled "VEHICLE AND METHOD FOR CONTROLLING A VEHICLE," which is incorporated herein by reference in its entirety.

TECHNICAL FIELD

The present disclosure relates to a vehicle and a method of controlling a vehicle. In particular the present disclosure relates to a vehicle comprising an electrically driven wheel axle having at least two road wheels, and to a method of controlling such a vehicle. Furthermore, the present disclosure relates to a computer program, a computer readable medium and a control unit.

The general inventive concept can be applied in heavy-duty vehicles, such as trucks and buses. Furthermore the general inventive concept may be applied in combined vehicles, such as a heavy-duty vehicle comprising a towing vehicle and a trailer configured to be towed by the towing vehicle. Such a trailer may be any type of trailing unit, e.g. a full trailer, a semi-trailer or a dolly trailer.

BACKGROUND

In the vehicle industry of today, there is generally much effort put into the development of electrically assisted propulsion of the vehicle. A vehicle may, for instance, have a primary power source, such as an internal combustion engine, and a secondary power source in the form of an electric machine providing propulsion power to an associated wheel axle. Another example is a trailer being towed by a towing vehicle, wherein the trailer may be equipped with an electric machine for contributing to the propulsion of the trailer, in addition to the towing force from the towing vehicle.

Although the increasing electrification in the vehicle industry is largely positive, there are instances in which vehicles having electric machines may provide concern. For instance, in the case of a fault event, when the vehicle needs to be towed to a workshop it is necessary to disengage the electric drive. This is normally done by removing the prop shaft. Failure to disconnect the prop shaft during towing, while the drive wheels are rolling, may lead to the high-voltage components becoming damaged and there is even a risk of fire. An example where this may be quite problematic may be in a long tunnel.

Another instance in which vehicles having electric machines may provide concern is in areas near sensitive electrical equipment, wherein running the electric machines on the vehicle may cause disturbance in proper operation of the sensitive electrical equipment.

In view of the above, it is readily envisaged that in the future there may be geographical areas in which vehicles being propelled by electric machines may not be permitted. This may, of course, cause difficulties when planning a route, forcing transports to be carried out with vehicles that are not propelled by electric machines, which in turn may lead to larger emissions and less environmentally friendly transports.

SUMMARY

An object of the invention is to provide a vehicle and a method which at least partly alleviate the above mentioned problems. This and other objects, which will become apparent in the following discussion, are accomplished by a vehicle and a method as defined in the accompanying independent claims. Some non-limiting exemplary embodiments are presented in the dependent claims.

The inventors of the present invention have realized that by providing a vehicle with an assisted electric propulsion which can be temporarily decoupled when entering geographical areas where such propulsion is not permitted, an environmentally friendly solution is achievable which still takes into account local restrictions. In particular, the inventors have realized that a trailer provided with an electric machine for assisted propulsion power, which would be classified as an electrified trailer, may be temporarily inactivated, thereby temporarily turning the electrified trailer into a normal trailer. It should be understood that although the main focus of this disclosure is in connection with a trailer towed by a towing device, the inventive principle of temporarily decoupling the propulsion contribution emanating from an electric machine based on the geographical position of the vehicle, may also be implemented for other types of vehicles, such as a truck or towing vehicle.

From the above, it should thus be understood that the general inventive concept, which allows position-based temporary disengagement of propulsion contribution from an electric machine, may be implemented in various types of heavy-duty vehicles. This will now be discussed in more detail with reference to a first aspect of the present disclosure.

According to a first aspect of the present disclosure, there is provided a vehicle which comprises:
 an electrically driven wheel axle having at least two road wheels,
 an electric machine for providing propulsion power to said wheel axle,
 a control unit configured to obtain positional data of the vehicle, said positional data containing information about the geographical location of the vehicle or the location of the vehicle relative to a reference point/area,
 wherein, based on said obtained positional data, upon determination by the control unit that the current location of the vehicle is a location where propelling the vehicle by providing electric propulsion to said wheel axle is not permitted, the control unit is configured to generate an output signal which automatically causes, or which suggests via a user interface notification to cause, a temporary disablement of the wheel axle and said at least two road wheels from providing a contribution to the propulsion power that propels the vehicle.

By providing such a location based control, the vehicle may benefit from the electric machine in locations where there is no restriction, thus contributing to reducing emissions, while in limited areas having restrictions, a temporary disablement may be set.

Thus, in addition to the electric machine there may suitably be another power source for propelling the vehicle during said temporary disablement. For instance, such another power source may be an internal combustion engine. In a combined vehicle, in which the vehicle comprises a trailer towed by a towing vehicle, said electric machine may be provided on the trailer to drive a trailer axle while said other power source may be located on the towing vehicle for powering a wheel axle of the towing vehicle.

It should be understood that, in at least some example embodiments, the electric machine may be used for selectively providing positive or negative torque, i.e. propulsion force and braking force, respectively. Thus, the temporary disablement may include disablement of the wheel axle and said at least two road wheels from providing a positive contribution and/or negative contribution to the propulsion power that propels the vehicle.

It should further be understood that the restriction may apply to a defined geographical area, such as for example defined by a tunnel and enclosure, or otherwise defined area, or it may apply to a location relative to a reference point/area, for example, within a certain radius of a point/area of reference. For example a point/area of reference may be a facility having sensitive equipment, wherein the restriction may apply to within a certain distance from the facility.

It should also be understood that the duration of said temporary disablement may suitably be limited to a time period during which the vehicle is positioned in a location where propelling the vehicle by providing electric propulsion to said wheel axle is not permitted. Once the vehicle leaves such a "non-permitting" location the control unit may suitably enable the wheel axle and said at least two road wheels to provide contribution to the propulsion power that propels the vehicle. This may be done by generating another output signal which automatically causes, or which suggests via a user interface notification to cause, such an enablement.

The vehicle may suitably be provided with a GPS system or a similar positioning system to enable the control unit to obtain said positional data. Thus, the control unit may be operatively connected to such a GPS system.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to at least one exemplary embodiment, said temporary disablement comprises a mechanical decoupling of the electric machine from said wheel axle. Thus, when the vehicle reaches a location where propelling the vehicle by providing electric propulsion to the wheel axle is not permitted, the control unit will mechanically decouple the electric machine from the wheel axle. This may be particularly advantageous in confined areas with limited space, such as for example tunnels or garages. In the event of a vehicle breakdown or other type of event requiring the vehicle to be towed away from such a confined area, the electric machine will already be decoupled from the wheel axle, thus avoiding the risks discussed above in the Background section of this disclosure. Thus, even though the wheels of said wheel axle are rolling when the vehicle is towed away, the wheel axle is safely decoupled from the electric machine.

According to at least one exemplary embodiment, the electric machine is operatively connectable to the wheel axle via a dog clutch, wherein said mechanical decoupling comprises inactivation of the dog clutch. A dog clutch is advantageous in that there is substantially no slip or fiction involved after engagement of the clutch, and therefor heat generation is very low.

According to at least one exemplary embodiment, the vehicle comprises a mechanism for lifting said at least two road wheels off the ground, wherein said temporary disablement comprises activating said mechanism so that said at least two road wheels are lifted off the ground. Thus, in the previously discussed scenario of a breakdown requiring towing of the vehicle, the road wheels will be off the ground not causing any rotation relative to the electric machine, and the vehicle may be safely towed away. Suitably, the mechanism may lift the wheel axle to which said at least two road wheels are connected.

According to at least one exemplary embodiment, the control unit is configured to obtain or access permission data from an electronic memory, said permission data containing information about locations where propelling the vehicle by providing electric propulsion to said wheel axle is not permitted, wherein the control unit is configured to compare the obtained positional data with said permission data to determine if the current location of the vehicle is a location where propelling the vehicle by electric propulsion to said wheel axle is not permitted. The electronic memory may be stored locally in the vehicle, such as in the control unit, or remotely from the vehicle and being wirelessly accessible by the control unit. For instance, the electronic memory may be provided on a remote server.

As understood from above, according to the present disclosure the temporary disablement may in at least some exemplary embodiments be caused automatically upon determination by the control unit that the current location of the vehicle is a location where propelling the vehicle by providing electric propulsion to said wheel axle is not permitted. This is advantageous as it avoids the risk of a driver overlooking the fact that the vehicle has entered an area where such electric propulsion is not permitted. Automatic temporary disablement, and subsequent re-enablement, may also be advantageous in exemplary embodiments in which the vehicle is an autonomous (i.e. self-driving) vehicle. Thus according to at least some exemplary embodiments, the vehicle is an autonomous vehicle.

Although automatic temporary disablement is advantageous, the present disclosure also encompasses exemplary embodiments allowing a driver of the vehicle to cause said temporary disablement (and subsequently when electric propulsion is permitted, e.g. the vehicle has left a restricted area, then the driver may cause a re-enablement of the electrically driven wheel axle). Thus, according to at least one exemplary embodiment, the vehicle comprises a remote control device for causing said temporary disablement, allowing a driver who has been notified via said user interface notification to operate the remote control device for causing said temporary disablement. The remote control device may suitably be a device located in the driver's cabin, but may in some exemplary embodiments be in other locations of the vehicle. The user interface notification may, for instance, be visual, audible or tactile. For example, the notification may be provided on a dashboard or an infotainment system of the vehicle. The remote control device may be a any suitable, device, such as a pressable/turnable button or a graphical icon on the infotainment system user interface, etc.

Even though some users may prefer to have the possibility of manually actuating the temporary disablement, such as by means of the above mentioned remote control device, there may be situations for which automatically caused disablement may be suitable. For instance, in case the electric machine provides wrong torque to the wheel axle, for example due to a control error, the disablement may suitably be automatically achieved. Similarly, if it is detected that the electric machine is out of order the disablement may suitable be automatic. Another example is if there is an incorrect wheel rotation, for example due to a small puncture or an incorrectly released brake. From the above, it should thus be understood that, according to at least one exemplary embodiment, the control unit may be configured to, in response to a fault event or a power loss, automatically cause an emergency disablement of the wheel axle and said at least two road wheels from providing a contribution to the propulsion power that propels the vehicles. It should be understood that in these type of fault events or power loss events, the emergency disablement is not limited to areas in which electric propulsion of the wheel axle is not permitted. Furthermore, the disablement in this fault events or power loss events is suitably a disablement which extends for a time period at least until the fault has be solved/repaired. It should be understood that these exemplary embodiments may provide add-on features to the basic general inventive concept of temporary disablement based on locations not permitting electric propulsion to said wheel axle.

In addition to the above exemplified safety aspects, there may be other aspects when safety measures may be suitable, for instance in case of the electrical machine being connectable/disconnectable to/from the wheel axle via a coupling, such as a dog clutch, it may be appropriate that the control unit checks that certain conditions are met before the coupling is activated. For example, in the case of the electric machine being provided on a trailer, the control unit may be configured to require a proper torque request in order to safeguard that the electrically powered trailer does not begin to move on its own. Such a torque request may come from a truck to which the trailer is coupled or from an authorized controller. In other exemplary embodiments, the control unit may be configured to determine that the support legs (on a trailer) are lifted before activating the coupling.

As has already been discussed above, the general inventive concept may be applied to various heavy-duty vehicles. In some exemplary embodiments the vehicle may be a combined vehicle. Thus, according at least one exemplary embodiment, the vehicle comprises a towing vehicle and a trailer configured to be towed by the towing vehicle, wherein said electrically driven wheel axle forms part of the trailer. Thus, by providing the trailer with an electric drive a contribution to the propulsion of the combined vehicle may advantageously be achieved, while allowing the control unit to disable such contribution in areas where it is not permitted. The control unit may, in at least some exemplary embodiments, be located in the towing vehicle and may send and receive output and input signals, respectively through wired or wireless communication means. This is advantageous as the same towing vehicle may be used in combination with different trailers, thus, not being necessary to equip each trailer of a fleet of trailers with such a control unit. Nevertheless, in other exemplary embodiments, it may be conceivable to have the control unit located on the trailer. In still other exemplary embodiments, the control unit may have a distributed configuration, part of which being provided on the towing vehicle and part of it being provided on the trailer. According to some exemplary embodiments, when the vehicle is a combined vehicle, the trailer may be a semi-trailer. In other exemplary embodiments, when the vehicle is a combined vehicle, the trailer may be a full trailer. In other exemplary embodiments the trailer may be a dolly trailer.

According to at least one exemplary embodiment, said electrically driven wheel axle may be a rear axle of the trailer. This may be advantageous from a load distribution perspective. However, according to at least one exemplary embodiment said electrically driven wheel axle may be any axle of the trailer.

According to at least one exemplary embodiment, the vehicle is a towing vehicle, such as a truck, wherein said electrically driven wheel axle is a wheel axle of said towing vehicle. One or more other wheel axles of the truck may suitably be driven by a different power source. However, in at least some exemplary embodiments, the electrically driven wheel axle may also be driven by another power source, wherein, in case the control unit determines that the current location of the vehicle is a location not permitting electric propulsion, the electric drive may be decoupled from the wheel axle while the other power source may remain coupled to the same wheel axle.

According to a second aspect of the present disclosure there is provided a method of controlling a vehicle which comprises an electrically driven wheel axle having at least two road wheels and an electric machine for providing propulsion power to said wheel axle, the method comprising:

obtaining positional data of the vehicle, said positional data containing information about the geographical location of the vehicle or the location of the vehicle relative to a reference point/area, generating an output signal upon determination, based on said obtained positional data, that the current location of the vehicle is a location where propelling the vehicle by providing electric propulsion to said wheel axle is not permitted, which output signal automatically causes, or suggests via a user interface notification to cause, a temporary disablement of the wheel axle and said at least two road wheels from providing a positive contribution to the propulsion power that propels the vehicle.

The advantages of the method of the second aspect are largely analogous to the advantages of the vehicle of the first aspect, including any embodiment thereof. Various exemplary embodiments of the method may be implemented by performing the steps performed by the control unit in the above mentioned exemplary embodiments of the vehicle of the first aspect. Some exemplary embodiments are listed below.

According to at least one exemplary embodiment of the method, said temporary disablement comprises a mechanical decoupling of the electric machine from said wheel axle, such as inactivation of a dog clutch by means of which the electric machine is operatively connectable to the wheel axle.

According to at least one exemplary embodiment of the method, said temporary disablement comprises activating a mechanism that lifts said at least two road wheels off the ground.

According to at least one exemplary embodiment, the method comprises:

obtaining or accessing permission data from an electronic memory, said permission data containing information about locations where propelling the vehicle by providing electric propulsion to said wheel axle is not permitted, and comparing the obtained positional data with said permission data to determine if the current location of the vehicle is a location where propelling the vehicle by electric propulsion to said wheel axle is not permitted.

According to at least one exemplary embodiment of the method, said vehicle is a trailer configured to be pulled by a towing vehicle.

According to a third aspect of the present disclosure, there is provided a computer program comprising program code means for performing the steps of the method of the second aspect, including any embodiment thereof, when said program is run on a computer. The advantages of the computer program of the third aspect are largely analogous to the advantages of the method of the second aspect, including any embodiment thereof.

According to a fourth aspect of the present disclosure, there is provided a computer readable medium carrying a computer program comprising program code means for performing the steps of the method of the second aspect, including any embodiment thereof, when said program product is run on a computer. The advantages of the computer readable medium of the fourth aspect are largely analogous to the advantages of the method of the second aspect, including any embodiment thereof.

According to a fifth aspect of the present disclosure, there is provided a control unit for controlling a vehicle, the control unit being configured to perform the steps of the method of the second aspect, including any embodiment thereof. The advantages of the control unit of the fifth aspect are largely analogous to the advantages of the method of the second aspect, including any embodiment thereof.

Generally, all terms used in the claims are to be interpreted according to their ordinary meaning in the technical field, unless explicitly defined otherwise herein. All references to "a/an/the element, apparatus, component, arrangement, device, means, step, etc." are to be interpreted openly as referring to at least one instance of the element, apparatus, component, arrangement, device, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
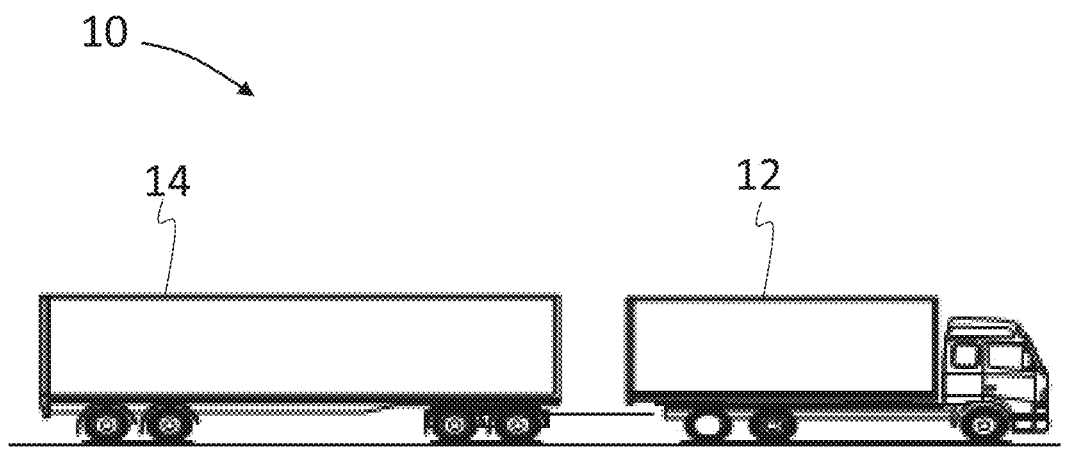
FIG. 1 illustrates a vehicle in accordance with at least one exemplary embodiment of the present disclosure.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 10 in accordance with at least one exemplary embodiment of the present disclosure. More specifically, the illustrated vehicle 10 is a heavy-duty vehicle combination which comprises a towing vehicle 12 and a trailer 14 which is towed by the towing vehicle 12. The towing vehicle 12 is here illustrated in the form of a truck, and the trailer 14 is illustrated in the form of a full trailer. It should however be understood that in other exemplary embodiments the trailer 14 may be a semi-trailer. It should further be understood that the general inventive concept is not limited to heavy-duty vehicle combinations, but may be implemented for single vehicles as well, such as for a single heavy-duty vehicle, for instance a truck, which does not necessarily need to have a trailer connected.

Figure 2:
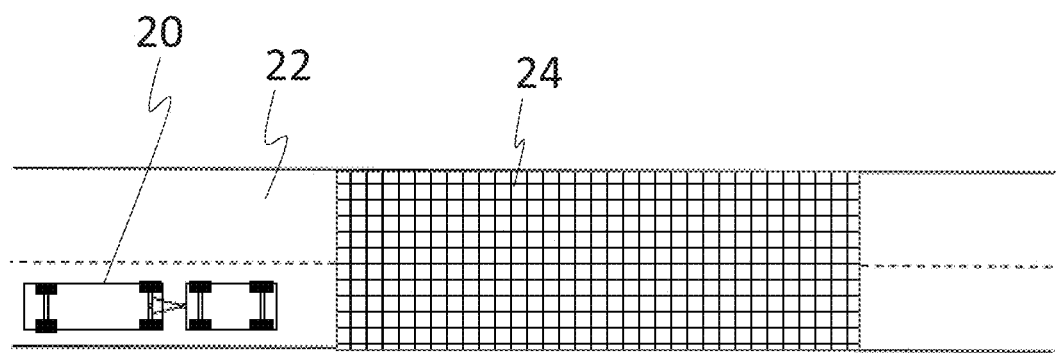
FIG. 2 illustrates schematically a vehicle approaching a limited area where propelling the vehicle by providing electric propulsion to a wheel axle is not permitted.

FIG. 2 illustrates schematically a vehicle 20 driving on a road 22. The vehicle 20 is approaching an area 24 or the road 22 which has been marked with a grid pattern. The area 24 is a limited area of the road 22, and represents a location where propelling the vehicle 20 by providing electric propulsion to a wheel axle is not permitted. The vehicle 20 may, for instance, be a vehicle of the kind illustrated in FIG. 1 or any other vehicle according to the present disclosure. The limited area 24 is here illustrated as a section of a road 22. As explained previously in this disclosure, it may for instance be inside a tunnel or near a facility having sensitive equipment, etc. Although the limited area 24 has been illustrated as a section of a road 22, it should be understood that the general inventive concept is conceivable also for other ways of defining a location where propelling a vehicle by providing electric propulsion to a wheel axle is not permitted. For instance, such a limited area may be defined as any location being within a certain radius from a certain point, or a limited area may be defined by the area of a piece of land/property, etc.

Figure 3:
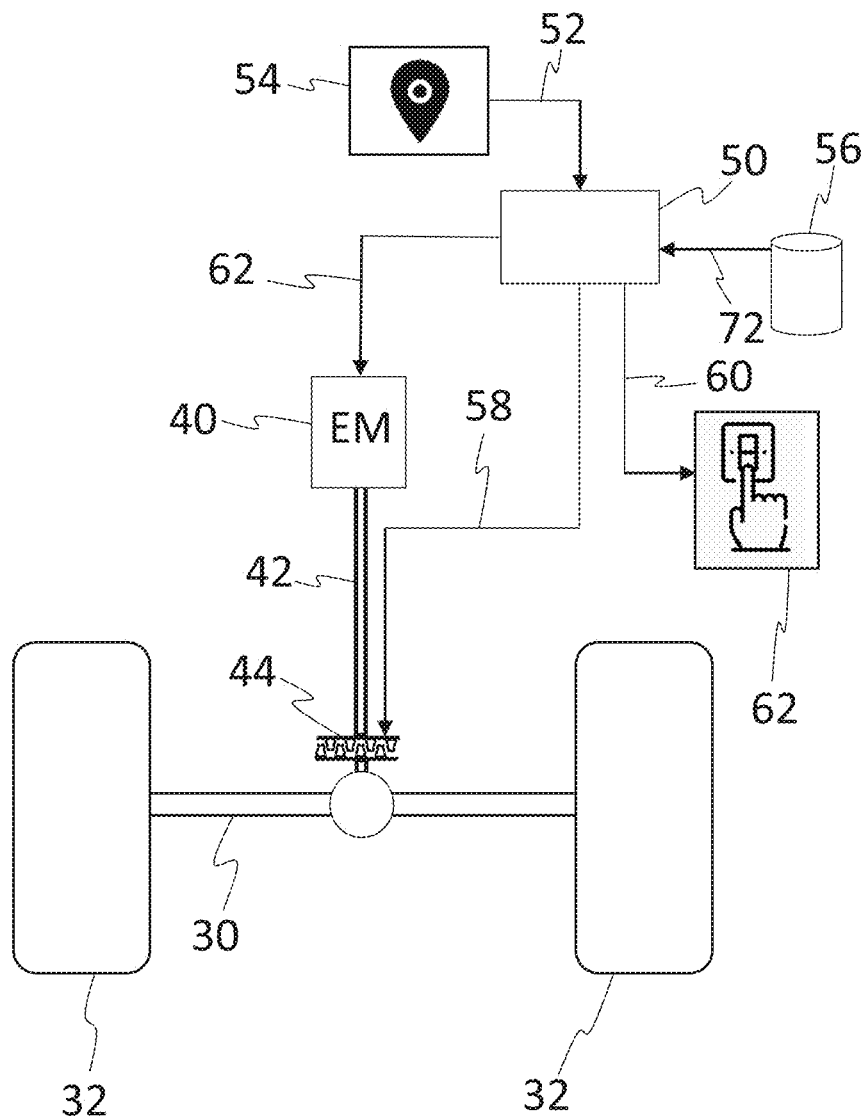
FIG. 3 illustrates schematically components of a vehicle according to at least one exemplary embodiment of the present disclosure.

FIG. 3 illustrates schematically components of a vehicle according to at least one exemplary embodiment of the present disclosure. The vehicle may for instance be the vehicle 10 in FIG. 1 or any other vehicle encompassed by the present disclosure. In FIG. 3 there is illustrated a wheel axle 30 of the vehicle. The wheel axle 30 has two road wheels 32, a left wheel and a right wheel. However, it should be understood that, in other exemplary embodiments, there may be more than two wheels 32 mounted on the same wheel axle 30, for instance two left wheels and two right wheels. The wheel axle 30 is driven by a power source in the form of an electric machine 40. Thus, the wheel axle 30 is an electrically driven wheel axle 30, and the electric machine 40 provides propulsion power to the wheel axle 30. The propulsion power may be transmitted via a driveshaft 42 and a coupling 44. The coupling 44 may, for instance, be in the form of a dog clutch.

As illustrated in FIG. 3, the vehicle also comprises a control unit 50. The control unit 50 is configured to obtain positional data 52 of the vehicle, said positional data 52 containing information about the geographical location of the vehicle or the location of the vehicle relative to a reference point/area. For instance, the positional data 52 may be obtained from a GPS system 54 (or the like) of the vehicle. In other exemplary embodiments, the positional data may be obtained from one or more sensors that may measure the proximity to a reference point, a beacon, or similar which may represent a reference point of a restricted area as regards electric propulsion of vehicles. Based on the positional data 52 (in FIG. 3 based on the positional data 52 obtained from the GPS system 54), the control unit 50 determines if the current location of the vehicle is a location where propelling the vehicle by providing electric propulsion to said wheel axle 30 is not permitted.

For instance, with reference to FIG. 2, when the vehicle 20 has reached the limited area 24, the control unit 50 will determine that propelling the vehicle 20 by providing electric propulsion to the wheel axle 30 is not permitted. With reference to FIG. 3, the control unit 50 may, for example, have access to a database 56 or similar in which different such limited areas are stored. For instance, the control unit 50 may continuously compare the current GPS coordinates of the vehicle (obtained from the positional data 52) with stored data from the database 56, wherein the stored data represent the locations where electric propulsion is not permitted. In exemplary embodiments in which the vehicle instead has, or additional has, proximity sensors or the like, accessing a database or similar may not be necessary. For instance, a signal may be sent from within a limited area, and sensors of the vehicle may pick-up that signal, and the control unit 50 may e.g. based on the signal strength determine if the vehicle is within the limited area or not.

Regardless of how the control unit 50 determines that the current location of the vehicle is a location where propelling the vehicle by providing electric propulsion to said wheel axle 30 is not permitted, once the control unit 50 has done such a determination, it is configured to generate an output signal 58 or 60 which automatically causes, or which suggests via a user interface notification 62 to cause, a temporary disablement of the wheel axle 30 and said at least two road wheels 32 from providing a contribution to the propulsion power that propels the vehicle.

The temporary disablement may be achieved by a mechanical decoupling of the electric machine 40 from the wheel axle 30. Thus, in FIG. 3, such a mechanical decoupling may comprise inactivating the coupling 44 (e.g. dog clutch). In embodiments in which the control unit 50 generates an output signal 58 which automatically causes the temporary disablement, the coupling 44 will be automatically inactivated. When the coupling 44 is inactivated the electric machine 40 cannot drive the wheel axle 30, and thereby the wheel axle 30 and its associated road wheels 32 will not provide a contribution to the propulsion power that propels the vehicle.

In other embodiments, the output signal 60 generated by the control unit 50 may instead notify a user and suggest to the user to inactivate the coupling 44, in which case the user (such as the driver) may suitably manually initiate a command signal which causes the temporary disablement/inactivation. Suitably, the vehicle may comprise a remote control device for causing said temporary disablement, allowing a driver who has been notified via said user interface notification 62 to operate the remote control device for causing said temporary disablement.

Regardless of the temporary disablement being achieved automatically or initiated by a user, once the electric machine 40 is decoupled from the wheel axle 30, in the event of an emergency such as a breakdown, the vehicle can be safely towed away without risking damages that may be caused if the electric machine 40 and the wheel axle 30 would still be coupled to each other. Suitably, at the same time as the control unit 50 generates the output signal 58 or 60, it may also turn off the electric machine 40 (e.g. by means of a control signal 62).

Figure 4:
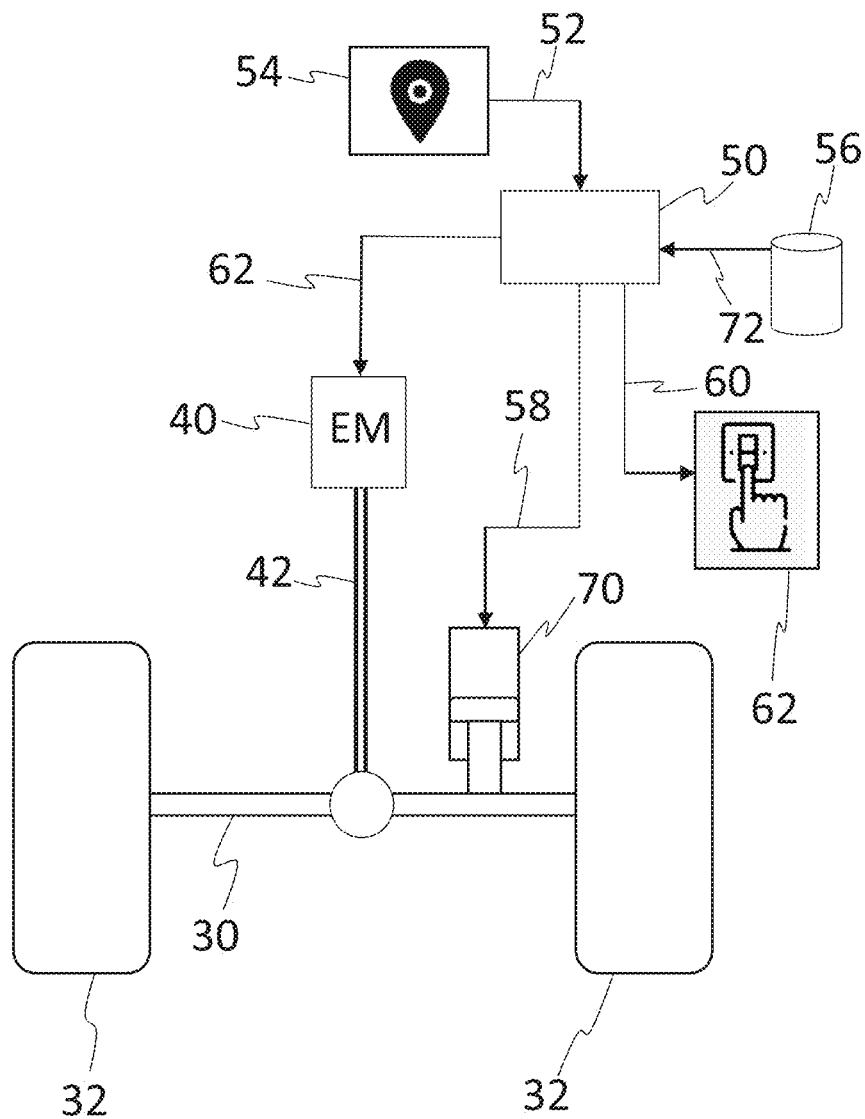
FIG. 4 illustrates schematically components of a vehicle according to at least another exemplary embodiment of the present disclosure.

FIG. 4 illustrates schematically components of a vehicle according to at least another exemplary embodiment of the present disclosure. The components largely correspond to the components in FIG. 3. However, in FIG. 4, the vehicle comprises a mechanism 70 for lifting the two road wheels 32 off the ground, such as by lifting the wheel axle 30. In this case the automatic or the manually initiated temporary disablement comprises activating said lifting mechanism 70 so that the two road wheels 32 are lifted off the ground.

It should be noted that although FIG. 4 does not illustrate an inactivatable coupling between the electric machine 40 and the wheel axle 30, in other exemplary embodiments the vehicle may comprise both disablement alternatives, i.e. the inactivatable coupling 44 in FIG. 3 as well as the lifting mechanism 70 in FIG. 4.

The previously mentioned database 56 is illustrated in both FIG. 3 and FIG. 4. Based on the information in the form of permission data 72 in the database 56 the control unit 50 can determine if the current location of the vehicle is in a location in which electric propulsion of the wheel axle 30 is not permitted. In a more general sense, however, the control unit 50 may be configured to obtain or access permission data 72 from an electronic memory, said permission data 72 containing information about locations where propelling the vehicle by providing electric propulsion to said wheel axle 30 is not permitted, wherein the control unit 50 is configured to compare the obtained positional data 52 with said permission data 72 to determine if the current location of the vehicle is a location where propelling the vehicle by electric propulsion to said wheel axle 30 is not permitted. The electronic memory may thus be provided in the vehicle itself, such as in the control unit 50, or in other exemplary embodiments it may be provided remotely and wirelessly accessible from the vehicle (such as via the Internet).

In addition to the temporary disablement occasioned by the current location of the vehicle as discussed in connection with FIGS. 1-4, it should be understood that the control unit 50 may also be configured to, in response to a fault event or a power loss, automatically cause an emergency disablement of the wheel axle 30 and said at least two road wheels 32 from providing a contribution to the propulsion power that propels the vehicle. The emergency disablement may be achieved by the corresponding mechanism as the temporary disablement, such as by a mechanical decoupling, for example inactivation of a dog clutch (FIG. 3) or activating a mechanism for lifting the road wheels off the ground (FIG. 4). As explained previously in this disclosure, such emergency disablement may be occasioned by the electric machine 40 providing incorrect torque or being out of order, or because of detected incorrect wheel rotation of one or both of said road wheels 32 of the wheel axle 30, or for any other error that may warrant an emergency disablement.

The electrically driven wheel axle 30 discussed in FIG. 3 and FIG. 4 may for example be a wheel axle of a trailer (such as a full trailer as in FIG. 1 or a semi-trailer) configured to be towed by a towing vehicle (such as a truck) in normal operating conditions. In particular the electrically driven wheel axle 30 discussed in FIG. 3 and FIG. 4 may be a rear axle of such a trailer. In at least some exemplary embodiments, the control unit 50 may be provided in the towing vehicle, while in other exemplary embodiments the control unit 50 may be provided in the trailing vehicle, while in still further exemplary embodiments the control unit 50 may have a distributed architecture being present in both the towing vehicle and the trailer.

In other exemplary embodiments the electrically driven wheel axle 30 may be a wheel axle of a towing vehicle, such as a truck.

Figure 5:
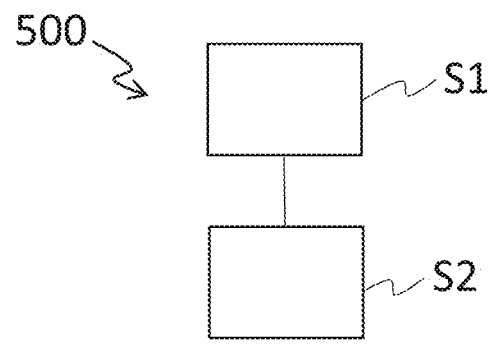
FIG. 5 illustrates a method in accordance with at least one exemplary embodiment of the present disclosure.
Figure 6:
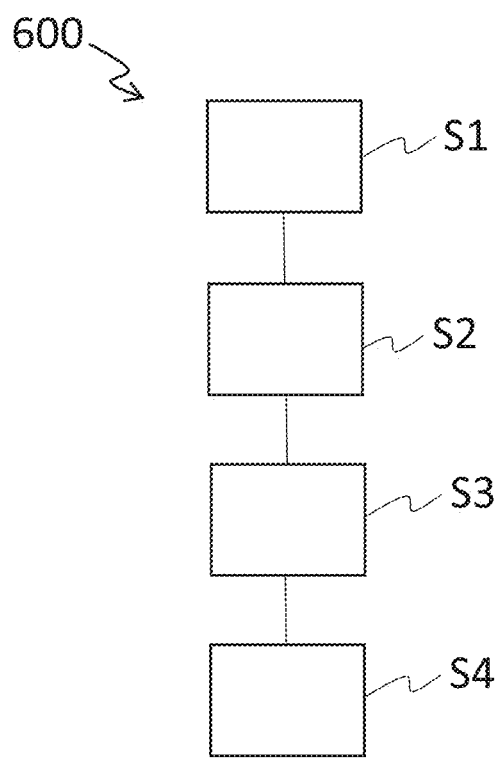
FIG. 6 illustrates a method in accordance with at least another exemplary embodiment of the present disclosure.

FIG. 5 illustrates schematically a method 500 in accordance with at least one exemplary embodiment of the present disclosure. In particular, FIG. 5 illustrates a method 500 of controlling a vehicle which comprises an electrically driven wheel axle having at least two road wheels and an electric machine for providing propulsion power to said wheel axle, the method 50 comprising:

in a step S1, obtaining positional data of the vehicle, said positional data containing information about the geographical location of the vehicle or the location of the vehicle relative to a reference point/area, generating an output signal upon determination, based on said obtained positional data, that the current location of the vehicle is a location where propelling the vehicle by providing electric propulsion to said wheel axle is not permitted, which output signal automatically causes, or suggests via a user interface notification to cause, a temporary disablement of the wheel axle and said at least two road wheels from providing a contribution to the propulsion power that propels the vehicle FIG. 6 illustrates schematically a method 600 in accordance with at least another exemplary embodiment of the present disclosure. In addition to steps S1 and S2 of FIG. 5, the method 600 in FIG. 6 further comprises:

in a step S3, obtaining or accessing permission data from an electronic memory, said permission data containing information about locations where propelling the vehicle by providing electric propulsion to said wheel axle is not permitted, and in a step S4, comparing the obtained positional data with said permission data to determine if the current location of the vehicle is a location where propelling the vehicle by electric propulsion to said wheel axle is not permitted.

It should be understood that the steps S1-S4 do not necessarily have to be performed in the listed order. For instance, step S3 may be performed prior to or simultaneously with either one of steps S1 and S2.

Figure 7:
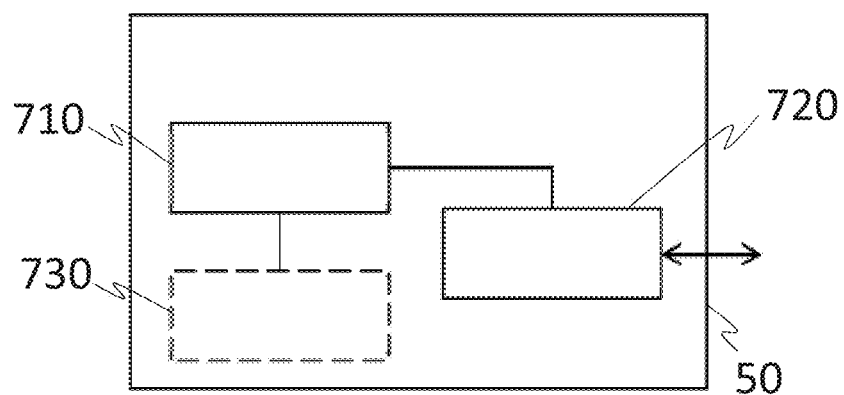
FIG. 7 schematically illustrates a control unit according to at least one exemplary embodiment of the present disclosure.

FIG. 7 schematically illustrates a control unit 50 according to at least one exemplary embodiment of the present disclosure. In particular, FIG. 7 illustrates, in terms of a number of functional units, the components of a control unit 50 according to exemplary embodiments of the discussions herein. The control unit 50 may be comprised in any vehicle disclosed herein, such as the one illustrated in FIG. 1 and others discussed above. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 50 to perform a set of operations, or steps, such as the method discussed in connection to FIG. 5 and/or FIG. 6 and exemplary embodiments thereof discussed throughout this disclosure. For example, the storage medium 730 may store the set of operations, and the processing circuitry 710 may be configured to retrieve the set of operations from the storage medium 730 to cause the control unit 50 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit 50 may further comprise an interface 720 for communications with at least one external device such as the GPS system, the electric machine, the dog clutch, the lifting mechanism and the user interface discussed herein. As such, the interface 720 may comprise one or more transmitters and receivers, comprising analogue and digital components and a suitable number of ports for wireline or wireless communication.

The processing circuitry 710 controls the general operation of the control unit 50, e.g. by sending data and control signals to the interface 720 and the storage medium 730, by receiving data and reports from the interface 720, and by retrieving data and instructions form the storage medium 730. Other components, as well as the related functionality, of the control unit 50 are omitted in order not to obscure the concepts presented herein.

Figure 8:
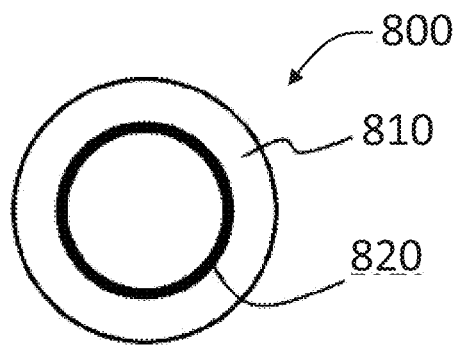
FIG. 8 schematically illustrates a computer program product according to at least one exemplary embodiment of the present disclosure.

FIG. 8 schematically illustrates a computer program product 800 according to at least one exemplary embodiment of the present disclosure. More specifically, FIG. 8 illustrates a computer readable medium 810 carrying a computer program comprising program code means 820 for performing the methods exemplified in FIG. 5 and/or FIG. 6, when said program product is run on a computer. The computer readable medium 810 and the program code means 820 may together form the computer program product 800.

The invention claimed is:

1. A vehicle comprising:
an electrically driven wheel axle having at least two road wheels,
an electric machine for providing propulsion power to the wheel axle, and
a control unit configured to obtain positional data of the vehicle, the positional data containing information about the geographical location of the vehicle or the location of the vehicle relative to a reference point/area,
wherein, based on the obtained positional data, upon determination by the control unit that the current location of the vehicle is a location where propelling the vehicle by providing electric propulsion to the wheel axle is not permitted, the control unit is configured to generate an output signal which automatically causes, or which suggests via a user interface notification to cause, a temporary disablement of the wheel axle and the at least two road wheels from providing a contribution to the propulsion power that propels the vehicle.

2. The vehicle of claim 1, wherein the temporary disablement comprises a mechanical decoupling of the electric machine from the wheel axle.

3. The vehicle of claim 2, wherein the electric machine is operatively connectable to the wheel axle via a dog clutch, and
wherein the mechanical decoupling comprises inactivation of the dog clutch.

4. The vehicle of claim 1, wherein the vehicle comprises a mechanism for lifting the at least two road wheels off the ground, and wherein the temporary disablement comprises activating the mechanism so that the at least two road wheels are lifted off the ground.

5. The vehicle of claim 1, wherein the control unit is configured to obtain or access permission data from an electronic memory, the permission data containing information about locations where propelling the vehicle by providing electric propulsion to the wheel axle is not permitted, and wherein the control unit is configured to compare the obtained positional data with the permission data to determine if the current location of the vehicle is a location where propelling the vehicle by electric propulsion to the wheel axle is not permitted.

6. The vehicle of claim 1, wherein the vehicle comprises a remote control device for causing the temporary disablement, allowing a driver who has been notified via the user interface notification to operate the remote control device for causing the temporary disablement.

7. The vehicle of claim 1, wherein the control unit is configured to, in response to a fault event or a power loss, automatically cause an emergency disablement of the wheel axle and the at least two road wheels from providing a contribution to the propulsion power that propels the vehicle.

8. The vehicle of claim 1, wherein the vehicle comprises a towing vehicle and a trailer configured to be towed by the towing vehicle, and wherein the electrically driven wheel axle forms part of the trailer.

9. The vehicle of claim 8, wherein the electrically driven wheel axle is a rear axle of the trailer.

10. The vehicle of claim 8, wherein the control unit is provided in the towing vehicle.

11. The vehicle of claim 1, wherein the vehicle is a towing vehicle, such as a truck, and wherein the electrically driven wheel axle is a wheel axle of the towing vehicle.

12. A method of controlling a vehicle which comprises an electrically driven wheel axle having at least two road wheels and an electric machine for providing propulsion power to the wheel axle, the method comprising:

obtaining positional data of the vehicle, the positional data containing information about the geographical location of the vehicle or the location of the vehicle relative to a reference point/area, and generating an output signal upon determination, based on the obtained positional data, that the current location of the vehicle is a location where propelling the vehicle by providing electric propulsion to the wheel axle is not permitted, which output signal automatically causes, or suggests via a user interface notification to cause, a temporary disablement of the wheel axle and the at least two road wheels from providing a contribution to the propulsion power that propels the vehicle.

13. The method of claim 12, wherein the temporary disablement comprises a mechanical decoupling of the electric machine from the wheel axle, such as inactivation of a dog clutch by means of which the electric machine is operatively connectable to the wheel axle.

14. The method of claim 12, wherein the temporary disablement comprises activating a mechanism that lifts the at least two road wheels off the ground.

15. The method of claim 12, further comprising:

obtaining or accessing permission data from an electronic memory, the permission data containing information about locations where propelling the vehicle by providing electric propulsion to the wheel axle is not permitted, and comparing the obtained positional data with the permission data to determine if the current location of the vehicle is a location where propelling the vehicle by electric propulsion to the wheel axle is not permitted.

16. The method of claim 12, wherein the vehicle is a trailer configured to be pulled by a towing vehicle.

17. A computer configured to run program code means for performing the steps of the method of claim 12.

18. A non-transitory computer readable medium carrying a computer program comprising program code means for performing the steps of the method of claim 12 when the program product is run on a computer.

19. A control unit for controlling a vehicle, the control unit being configured to perform the steps of the method of claim 12.

* * * * *